INVENTOR
JAN L. DE KROES
BY Frank R. Trifari
AGENT

INVENTOR
JAN L. DE KROES
BY Frank R. Trifari
AGENT

United States Patent Office 3,311,708
Patented Mar. 28, 1967

3,311,708
MEANS FOR IDENTIFYING FREE CHANNELS IN AN AUTOMATIC SWITCHING SYSTEM

Jan Louis de Kroes, Hilversum, Netherlands, assignor to North American Philips Company, Inc., New York, N.Y., a corporation of Delaware Filed June 28, 1963, Ser. No. 291,489
Claims priority, application Netherlands, July 25, 1962, 281,507
6 Claims. (Cl. 179—18)

Figure 1:
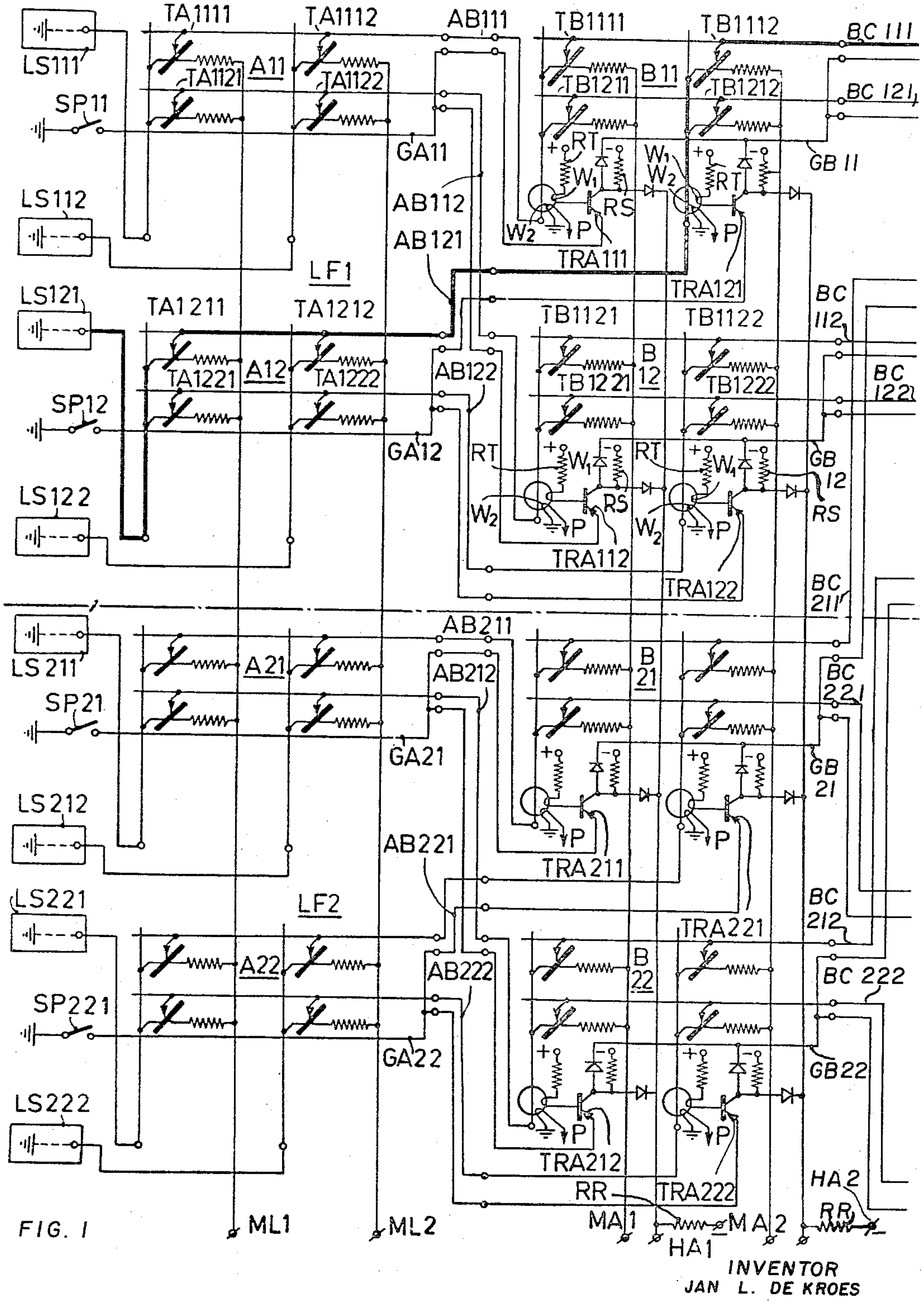

The invention relates to a device for an automatic switching system, for example a telephone system, comprising first and second groups of conductors, and a number of successive connection switching stages located between the two groups of conductors. The switching stages are interconnected by groups of intermediate conductors. Each group of intermediate conductors is located between two successive connection switching stages. A number of connection routes are possible between each conductor of the first group and each conductor of the second group. Each of these routes pass through a series arrangement of intermediate conductors, so that each series arrangement includes one intermediate conductor from each intermediate conductor group.

Such a device is used, for example, as a speech path switching network in an automatic telephone exchange in which speech paths are built up between subscribers' connections and connecting circuits or registers under the control of a marker or marking member. Between a subscribers' connection to the speech path switching network and a connecting circuit, a number of routes are possible which are either free or busy. Thus, in such a speech path switching network it is necessary to determine which free routes are available, and to choose one single free route out of the free routes available. Circuit arrangements have already been proposed which determine the free and the busy condition of all the intermediate conductors in a possible connection route and select a number of free intermediate conductors which together form a free route. Such arrangements, however, have been quite complicated.

It is the object of the invention to solve the said problem in a simpler manner in a device of the type described above.

According to the invention, an element with a negative resistance characteristic is associated with each intermediate conductor. This element is cut off in the busy condition of the intermediate conductor. The elements associated with the intermediate conductors in a connection route are connected in series. The series arrangement of the elements associated with the various possible connection routes between a given conductor of a group and a given conductor of the other group are connected between the terminals of a voltage source, by way of a contact associated with the conductor of the one group, a contact associated with the conductor of the other group, and a common resistor.

One type of element with a controllable negative resistance characteristic which is particularly suitable for use in the device according to the invention, is a transistor of the four-layer-type pnpn or npnp having a base connection. A control current may be supplied to the base connection for switching the transistor into circuit, so that, as a result of internal regenerative action, the transistor after switching on, passes into the saturated condition and remains in this condition so that the base voltage may return to the rest value without influencing the current through the transistor.

Another known element with a negative resistance characteristic is a tunnel diode which, for use in the device according to the invention, is connected in series with a transistor switch, for cutting off the tunnel diode. The transistor is either conductive or non-conductive in accordance with the condition of the intermediate conductor.

Figure 2:
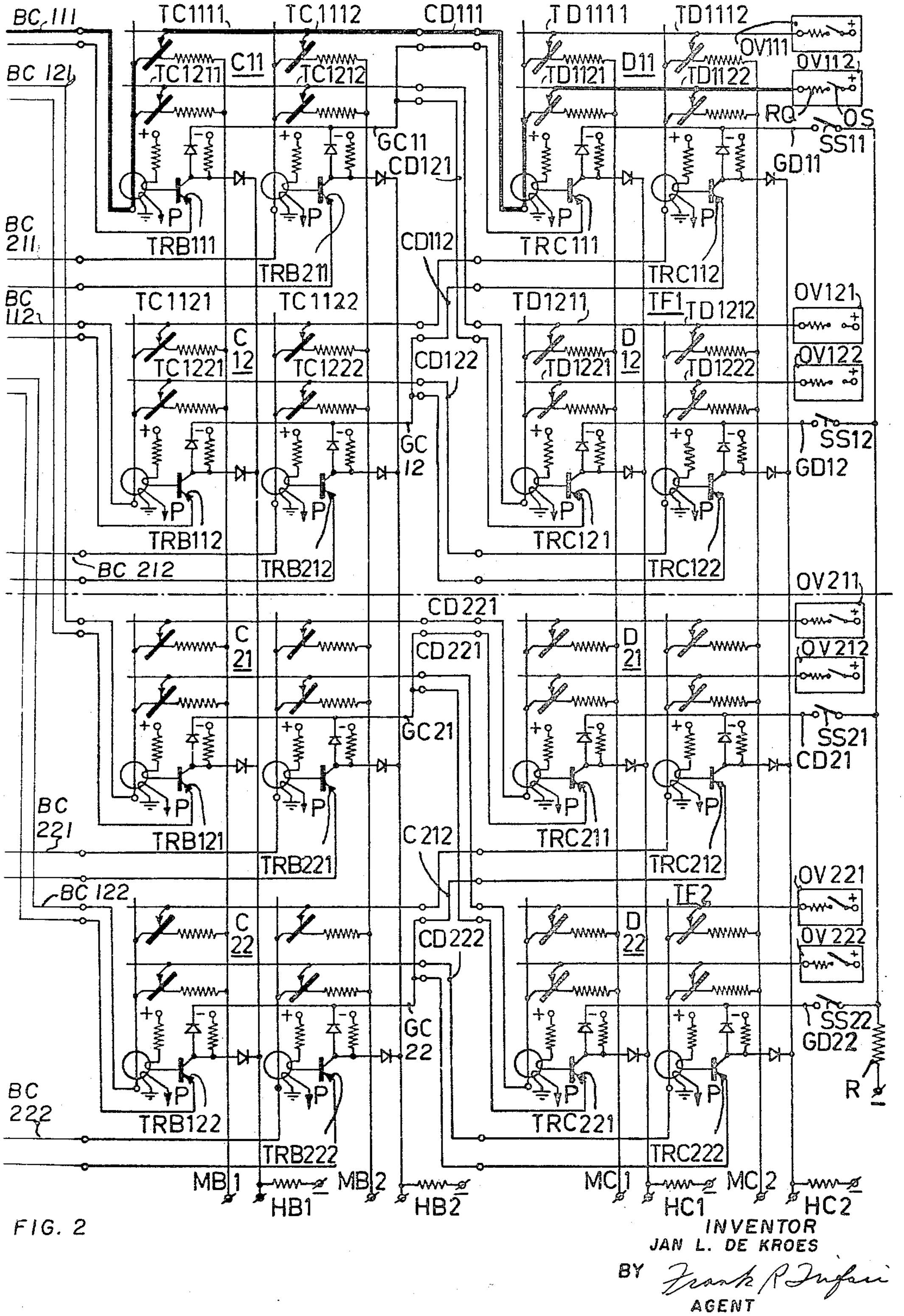

In order that the invention may readily be carried into effect, one embodiment thereof will now be described more fully, by way of example, with reference to the accompanying drawing, the FIGURES 1 and 2 of which should be arranged side by side with FIGURE 1 on the left.

The device shown in the figure represents a speech path switching network of an automatic telephone exchange. The speech path switching network establishes and maintains a speech path or, in general, a connection route between, for example, subscribers' line circuits on the one hand and outgoing, incoming and local connection repeating selectors and registers on the other hand. The connection routes are established through electronic speech contacts formed by the emitter-collector path of transistors having a current amplification factor exceeding 1, for example of the pnpn-type. As shown in the figures, each connection route is established through a single conductor which extends from a given chosen repeating selector to a given desired subscribers' line circuit by way of electronic contacts in a number of successive connection switching stages.

The device according to the invention, which in the figures is combined with the speech path switching network, selects a connection route through the speech path switching network. The speech path switching network is constructed so that between a given repeating selector and a given subscribers' line circuit various connection routes are possible. This device according to the invention, which for the sake of brevity will hereinafter be called a "free-route selector," selects one free connection route out of the possible connection routes which are free and immediately provides the setting information in the form of voltages on a number of conductors. This information is required for setting the chosen free connection route.

For explaining the present invention it is not necessary to give a full reproduction of the speech path switching network of an automatic telephone exchange of a size occurring in practice. Although the free-route selector is meant for use in an automatic telephone exchange of a size occurring in practice of, for example, from 4000–10,000 subscribers' connections, the invention will be explained with reference to a speech path switching network of an automatic telephone exchange which is considerably reduced in size. In this manner, the speech path switching network in the figures and the associated free-route selector according to the invention is shown for an automatic telephone exchange having 8 subscribers' connections and eight repeating selectors or registers, everything which is not directly related to the invention being omitted.

The speech path switching network shown in the figures comprises two primary frames $LF_1$ and $LF_2$ and two secondary frames $TF_1$ and $TF_2$. Four subscribers' line circuits LS are connected to each primary frame, and four repeating selectors or registers OV are connected to each secondary frame. Circuits and circuit elements of the same type are indicated in the figures by the same letter or letter combination, which references, for distinguishing from circuits or circuit elements of the same type, are followed by one or more indices. Thus the line circuit LS is any of the line circuits LS111, LS112 . . . A primary frame comprises two A-switches and two B-switches. Each A-switch is connected to each B-switch through an AB-conductor (link) in each primary frame. Two line circuits are connected to each A-switch. A secondary frame contains two C-switches and two D-switches. Each C-switch is connected to a D-switch through a CD-conductor in each secondary frame. Two repeating selectors OV are connected to each D-switch. In this manner one connection route is possible between each A-switch and each B-switch in each primary frame and one connection route is possible between each C-switch and each D-switch in each secondary frame. Between each primary frame LF and each secondary frame TF a number of connection routes are possible which are each effected through one BC-conductor (junctor). These connections are provided in such a manner that a B-switch in a primary frame is connected through a BC-conductor to one C-switch in each secondary frame. Between a given line circuit LS and a given repeating selector OV a number of connection routes are thus possible. Each connection route includes one AB-conductor, one BC-conductor and one CD-conductor, and the number of possible connection routes is equal to the number of BC-conductors between the primary and the secondary frame. In this example the number is 2. In the figures, a possible connection route between the line circuit LS121 and the repeating selector OV112 is shown in thick lines. This connection route includes the conductors AB121, BC111, and CD111. The second possible connection route between the said line circuit and the said repeating selector includes the conductors AB122, BC112 and CD112.

The A, B, C and D switches are of the cross-bar switch type and comprise electronic contacts between the conductors of the two groups at the intersections of the two groups of conductors. The contacts are each formed by the emitter-collector path of a transistor of the current-amplifying type. One of the two groups of conductors is shown in a horizontal direction and is referred to as the horizontal group, while the other group is shown in the vertical direction and is referred to as the vertical group. For example, the line circuits LS are connected to the vertical groups of the A-switch and the AB conductors are connected to the horizontal groups of the A-switches and the vertical groups of the B-switches. Naturally, the choice of the number of conductors in a group is arbitrary. In the example, each group comprises two conductors, so that a total of four intersections are available in each switch. A transistor is connected at each intersection between a conductor of a horizontal group and a conductor of a vertical group. The emitter electrode of the transistor is connected to the conductor of the horizontal group and the collector electrode of which is connected to the conductor of the vertical group. The base electrodes of the transistors are connected, through separate resistors, to a marking member associated with the conductor of the vertical group.

In order to give an idea of the speech path switching network of an automatic telephone exchange of a size occurring in practice, an automatic 4000-line exchange is chosen by way of example having 800 repeating selectors or registers. A speech path switching network of such a telephone exchange comprises, for example, 10 primary frames LF each having 10 A-switches and 10 B-switches. Each A-switch has 40 connections in the vertical group and 40 connections in the horizontal group. The number of subscribers' connections per primary frame then amounts to 400 and for the 10 frames a total of 4000. The B-switches have 10 connections in a vertical group and 10 connections in a horizontal group. The number of AB-conductors in a primary frame consequently is 100 and there are 100 BC conductors connected to a primary frame. In addition, the speech path switching network comprises 10 secondary frames TF with each 10 C-switches and 10 D-switches. The C-switches have 10 connections in a vertical group and 10 connections in a horizontal group. The number of BC-conductors connected to a secondary frame TF is 100 so that each primary frame is connected to each secondary frame through 10 BC-conductors. Consequently, the number of possible connection routes between a subscribers' line circuit and a repeating selector also is 10. Each D-switch has 10 connections in a vertical group and 8 connections in a horizontal group. The number of CD-conductors in a secondary frame consequently is 100 and the number of repeating selector connections per secondary frame is 80 and for the 10 secondary frames a total of 800.

A given connection route through the speech path switching network is characterized by a number of indices:

*p*—the number of the primary frame
*a*—the number of the A-switch in the primary frame
*m*—the number of the connection in the vertical group of the A-switch in the primary frame
*s*—the number of the secondary frame
*d*—the number of the D-switch in the secondary frame
*n*—the number of the connection in the horizontal group of the D-switch in the secondary frame
*t*—the number of the BC-conductor between the primary and the secondary frame, which number also equals the number of the B-switch in the primary frame and the number of the C-switch in the secondary frame.

The connections in the vertical groups of the B-, C- and D-switches are also numbered and are indicated by the indices *a*, *p* and *t* respectively. The number of the vertical connection of the B-switch consequently indicates which switch is connected to this connection. The number of the vertical connection of the C-switch indicates which primary frame is connected to this connection. The number of the vertical connection of a D-switch finally indicates which C-switch is connected to this connection and, also, which number the connection route bears which can be reached through this connection. The marking conductors which are associated with conductors of the vertical group are numbered in the same manner as this group. Marking conductors of the A, B, C and D-switches having the same number are combined to the common marking conductors ML*m*, MA*a*, MB*p* and MC*t* respectively.

A line circuit is indicated by the indices *p, a, m,* so by LS *p, a, m.* A repeating selector is indicated by the indices *s, d, n,* so by OV *s, d, n.* The systematic construction of the speech path switching network further renders it possible to indicate the AB, BC and CD conductors by AB *p, a, t*; BC *p, s, t*; CD *s, d, t* respectively. The electronic contacts are indicated by the letter T followed by the letter indication of the switch and four indices of which the first three are the same as the indices of the conductor or repeating selector connected to the horizontal connection in question and the last index of which is the same as the index of the vertical connection in question. Thus the electronic contacts of, for example, the A-switches are indicated by TA *p, a, t, n.*

The particular construction of the speech path switching network, which construction is known as the system of crossbar switches number 5, renders it possible in the above-described manner to describe the connection routes through the speech path switching network between a given line circuit LS *p, a, m* and a given repeating selector OV *s, d, n* with the indices of this line circuit and repeating selector, so with the indices *p, a, m* and *s, d, n* and an additional index *t* which indicates the number of this connection route.

Before a connection route is built up between a given repeating selector and a given line circuit, it should be tested to determine whether free connection routes exist between the repeating selector and the line circuit, and one free connection route has to be chosen from the free connection routes available. Each of the AB, BC and CD conductors in a connection route must be free individually in order to be able to form a free connection route together. As will be proved, a free conductor is characterized by the absence of a current through the conductor.

According to the invention, a transistor is associated with each of the AB, BC and CD conductors. These conductors are indicated in the figures by TRA, TRB and TRC respectively followed by the same indices as the corresponding conductor. These transistors are shown in the B, C and D-switches. As is the case with the electronic contacts in the switches, these transistors are of the type having a current amplification factor exceeding 1. In addition, according to the invention a conductor is associated with each of the A, B, C and D-switches, these conductors being indicated by GA, GB, GC and GD respectively. The emitter electrodes of the transistors which are associated with the AB, BC and CD-conductors respectively on the horizontal group are connected to conductors GA, GB and GC, respectively, and the conductors GD are connected to the negative terminal of a battery (not shown) by way of the individual contacts SS through a common resistor R. The positive terminal of this battery is connected to ground. The collector electrodes of the transistors which are associated with the AB, BC and CD-conductors respectively connected to the vertical group of a switch are connected to the conductors GB, GC and GD respectively through decoupling diodes, and the conductors GA are connected to ground through individual switching contacts SP.

The base electrodes of the transistors TRA, TRB and TRC associated with the AB, BC and CD conductors respectively are connected, through a winding $W_1$ provided on a core K of magnetically saturated material and a resistor RT, to a terminal to which a positive voltage is supplied. This voltage is operative in the blocking direction of the transistor and prevents the transistor from becoming conductive if a supply voltage is made operative in the emitter-collector circuit of the transistor. The core K is also coupled magnetically to the conductor corresponding to the transistor which is threaded through the ring core in the manner shown in the figure, or is wound around the core once or several times. The current flowing through the conductor in the busy condition magnetizes the core to a state of magnetic saturation. In addition, a winding $W_2$ is provided on the core which is connected to a pulse source P. Source P is common for all the cores and is not shown in the drawing. A pulse applied by the pulse source is transmitted, in the non-saturated condition of the core, to the winding $W_1$. The transmitted pulse is operative in the forward direction of the transistor and thus releases it. If the core is in the saturated condition because the conductor coupled to the core is busy and consequently conveys a current, a pulse from the pulse source P is not transmitted to the winding $W_1$ so that the transistor remains cut off.

The elements associated in the manner described above with the speech path switching network described, together form a free-route selector which renders it possible to select a free connection route between a given line circuit and a given repeating selector. In the speech path switching network shown in the figures, there are always two connection routes possible while in the automatic 4000-line telephone exchange described above there are 10 possible connection routes.

In the manner shown in the figures, the transistors TRA, TRB and TRC associated with the AB, CD and BC conductors connected in a connection route are connected in series. The transistors associated with the two possible connection routes thus comprise two parallel branches, and each branch comprises the series arrangement of the emitter collector paths of three transistors associated with one connection route. In the case given as example in which a connection route has to be built up between line circuit LS121 and repeating selector OV112, one branch comprises the series arrangement of the transistors associated with the conductors AB121, BC111 and CD111 and the other branch comprises the series arrangement of the transistors associated with the conductors AB122, BC112 and CD112. In order to choose a free route, the switching contact SP12 and the switching contact SS11 are closed, as a result of which the conductor GA12 associated with the switch A12 to which the relative line circuit LS121 is connected, is connected to ground and the conductor GB11 associated with the switch D11 to which the repeating selector OV112 is connected, is connected to resistor R. At the same time, a pulse of the pulse source P is supplied to the windings $W_2$ of all the cores K, as a result of which all cores which are coupled magnetically to free intermediate conductors transmit a pulse to the respective winding $W_1$. As a result of this, all transistors which are associated with free intermediate conductors are released. It is assumed that in the two possible connection routes the AB, BC and CD conductors are free. In this case a pulse is transmitted to the base electrodes of all the transistors corresponding to the two possible connection routes. The parallel branches constituted by the series arrangements of the transistors are connected, through the switching contacts SP12 and SS11 in series with the common resistor R between the terminals of a battery not shown. The current amplification factor of these transistors exceeds 1, so that the transistors, after having been switched on initially by the pulse on the base electrode, remain conductive after termination of the pulse as a result of internal regenerative action. A current now flows through the base resistor in the opposite direction which, however, does not cut off the transistor. The voltage drop across the transistors is very small in the conductive condition, so that the voltage supplied by the battery appears substantially entirely across the resistor R. The current supplied, however, is not sufficient to maintain the transistors in the two parallel branches in the conductive condition, so that the transistors associated with one of the branches pass into the non-conductive condition. It is assumed that this is the case with the transistors TRA122, TRB112 and TRC112 which are associated with the conductors AB122, BC112 and CD112. The transistors TRA121, TRB111 and TRC111 in the other branch which are associated with the conductors AB121, BC111 and CD111 remain in the conductive condition until the switches SP12 and SS11 are opened.

If in one of the two possible connection routes an intermediate conductor is busy, the pulse from the pulse source P is not transmitted to the transistor associated with this conductor. In this case, at least one of the transistors in the series arrangement of the transistors associated with this connection route after closing a switch SP and closing a switch SS remains cut off, and the series arrangement of these transistors is consequently excluded from further selection.

Thus a free-route selector is realized in the manner described. The selection of a free connection route is effected by a simultaneous search for all possible free connection routes, and the automatic selection of one free selection route. As a matter of fact, in this case the free or busy condition of the individual intermediate conductors is not tested but all the intermediate conductors which form a possible connection route are simultaneously tested. This concept leads to a considerable simplification of the control of the speech path switching network because a busy intermediate conductor excludes all the other intermediate conductors in the same connection route from further selection. The search for the free or busy condition of an intermediate conductor is reduced in the manner described to a non-selective test; as a matter of fact, all the intermediate conductors of the speech path switching network are simultaneously tested by the same testing pulse from the pulse source P.

The collector electrodes of the transistors are normally at the negative voltage supplied thereto by way of resistors RS. The transistors in the conductive branch all have substantially ground potential. This potential rise is supplied through decoupling diodes to a number of indicating conductors common for all the transistors which are associated with the conductors connected to connections having the same number in the vertical branch of all the B, C and D switches respectively. These indicating conductors, which are indicated by HA, HB and HC respectively followed by the index of the relative vertical connection, namely *a*, *p* and *t* respectively, are thus associated with the same vertical connections as the marking conductors MA*a*, MB*p* MC*t*. The indicating conductors in the rest condition have a negative voltage which is supplied to the indicating conductors through resistors RR. In the present case, in which the transistors TRA121, TRB111 and TRC111 are conductive, as a result of which the collector voltage of these transistors has increased to ground potential, the voltage of the indicating conductors HA1, HB1 and HC1 also increases to ground potential.

As already described, a connection route through the speech path switching network is entirely determined, with the exception of the index *t*, by the indices of the line circuit and of the repeating selector. Since only one of the indicating conductors HCT is at ground potential, the index *t* is thus determined unambiguously. In the present case, *t* equals 1.

In a selected connection route, the transistors $TA_{p,a,t,m}$; $TB_{p,s,t,a}$; $TC_{s,d,t,p}$ and $TD_{s,d,n,t}$ have to be made conductive. For this purpose a marker or marking member marks all the transistors that are connected to the marking conductors ML*m*, MA*a*, MB*p*, MC*t*, the indices of which are given by the indices of the line circuit and the index *t* determined in the above described manner and the marker marks the repeating selector $OV_{s,d,n}$. The indices in this case are $m=1$, $a=2$, $p=1$, $t=1$, $s=1$, $d=1$ and $n=2$.

The part of the repeating selector which is of importance for building up and maintaining a connection route is shown in the figures and consists of a resistor RQ which, through a repeating selector contact OS, is connected to a terminal to which a positive voltage of, for example, 24 v. is supplied. Marking the repeating selector is effected by closing the relative repeating selector contact OS, as a result of which a voltage of +24 v. is applied to the horizontal connection of the D-switch. In order to mark the marking conductors, the marker supplies pulses to the marking conductors which temporarily reduces the quiescent voltage of the marking conductors, which is, for example, +30 v. to +16 v. In the present case, the marker supplies pulses to the conductors ML1, MA2, MB1 and MC1 and the marker closes the contact in the repeating selector OV112. The transistors TD1121, TC1111, TB1112 and TA1211 in the selected connection route are now successively conductive beginning with the transistor TD121. The difference voltage applied in the forward direction of the transistor by the marking conductor MC1 and the repeating selector OV112 between the emitter electrode and the base electrode of the transistor TD1121 switches on the transistor. The voltage drop across a conductive transistor is very small so that the voltage at the emitter electrode of the transistor is supplied to the conductor CD111 connected to the collector electrode. The difference voltage between the marking conductor MB1 and the conductor CD111 then switches on the transistor TC1111, the voltage at the emitter being transmitted to the conductor BC111 connected to the collector electrode. Then the transistor TB112 is switched on by the difference voltage operative between the marking conductor MA1 and the conductor BC111 and finally the transistor TR1211 is switched on by the difference voltage operative between the marking conductor ML1 and the conductor AB121. The vertical connections of the A-switches in the line circuits are connected to ground through the dotted-line connections which are constituted, for example, by a secondary winding of a transformer which serves for transmitting speech signals. As soon as the last transistor in a connection route, in this case the transistor TA1211, has become conductive, the potential of the connection route falls to ground potential, and the voltage supplied by the repeating selector of 24 v. appears substantially entirely across the resistor RQ. The transistors are of the current amplifying type, as a result of which, after removing the marking voltage of the marking conductors, the transistors remain in the conductive condition due to internal regenerative action. A given quiescent current now flows through the transistors in the established connection route, and this current magnetically saturates the cores coupled to the conductors in this connection route. Consequently, these conductors are excluded in the selection of another connection route.

After selection of a free connection route through the speech path switching network by means of the indicating conductors, the free-route selector indicates which connection route is chosen. As a matter of fact, one of the indicating conductors HA*a* is at earth potential, as well as one of the indicating conductors HB*p* and one of the indicating conductors HC*t*. The marker is a central member which can select, by means of the indices of the line circuit, namely *p*, *a* and *m* and with the index *t* determined by the free-route selector, one of the marking conductors ML*m*, one of the marking conductors MA*a*, one of the marking conductors MB*p* and one of the marking conductors MC*t* and, for this purpose, is provided with a few selection circuits. The free-route selectors, however, immediately indicate, due to the voltages on the indicating conductors, which of the corresponding marking conductors MA*a*, MB*p*, and MB*t* are to be marked for adjusting the selected connection route. As a result of this it becomes possible to simplify the marker. For this purpose the indicating conductors immediately indicate, by means of gates, the corresponding marking conductors to which a marking pulse has to be supplied. It is sufficient for the marker to supply a marking pulse to the inputs of all gates united to form a common marking line. An indicating conductor which is at earth potential, renders the corresponding gates conductive which results in the marking pulse supplied to the marking line being transmitted through this gate to the corresponding marking conductor connected to the output of the gate. In addition, the control of the free-route selector may partially be performed by the marker. The marker has already a selection circuit for selecting and marking a repeating selector on behalf of the adjustment of a connection route, and this selection circuit may also be used for selecting the switching contact SS which is associated with a group of repeating selectors which are connected to the same D-switch. In addition, the marker should comprise a selection circuit for selecting the switching contact SP which is associated with a group of subscribers which are connected to the same A-switch.

What is claimed:

1. Means for identifying free channels in an automatic switching system of the type having first and second groups of conductors, a plurality of switching stages sequentially arranged between said first and second groups, a plurality of first conductors for connecting each conductor of said first group to the first stage, a plurality of second conductors for connecting each conductor of said second group to the last stage, and a plurality of intermediate conductors for connecting each stage to the next succeeding stage, each switching stage comprising a plurality of switch means whereby a plurality of channels are provided between each conductor of said first group and each conductor of said second group, each channel comprising a first conductor, an intermediate conductor between each stage, and a second conductor; said means for identifying free channels comprising a plurality of elements having negative resistance characteristics, each said element corresponding to a separate intermediate conductor, means for biasing each said element to a nonconductive state when the respective intermediate conductor forms a part of a busy channel, a separate first point corresponding to each conductor of said first group and a separate second point corresponding to each conductor of said second group, a source of potential, means for interconnecting said elements between said first and second points whereby a plurality of paths are formed between each first point and each second point by way of a plurality of said elements in series relationship, each said path including only those elements which correspond to intermediate conductors forming a single channel between the conductors of the first and second groups corresponding to the respective first and second points, means for selectively connecting said source between a first point and a second point, and means for indicating current flow in said paths.

2. The means of claim 1, wherein said means for selectively connecting said source between a first point and a second point comprises common resistor means, said common resistor means having sufficient resistance that the current flow between the selected first and second paths is sufficient to maintain conduction in only one path connected between said selected first and second points.

3. Means for identifying free channels in an automatic switching system of the type having first and second groups of conductors, a plurality of switching stages sequentially arranged between said first and second groups, a plurality of first conductors for connecting each conductor of said first group to the first stage, a plurality of second conductors for connecting each conductor of said second group to the last stage, and a plurality of intermediate conductors for connecting each stage to the next succeeding stage, each switching stage comprising a plurality of switch means whereby a plurality of channels are provided between each conductor of said first group and each conductor of said second group, each channel comprising a first conductor, an intermediate conductor between each stage, and a second conductor; said means for identifying free channels comprising a plurality of elements having negative resistance characteristics, each said element corresponding to a separate intermediate conductor, means for biasing each element to a nonconductive state when the respective intermediate conductor forms a part of a busy channel, a separate first point coresponding to each conductor of said first group, a separate second point corresponding to each conductor of said second group, means for interconnecting said elements between said first and second points whereby said elements are connected between each first point and second point in the same relationship that the corresponding intermediate conductors are connected in channels between the respective conductors of the first and second groups, so that a plurality of series paths of elements are connected between each first point and each second point, a source of potetnial, means for selectively connecting said source between a first point and a second point, and means for indicating current flow in the paths between said first and second points.

4. The means of claim 3, wherein said elements are four-layer transistors having emitter, base and collector electrodes, said means for interconnecting said elements comprising means for interconnecting the emitter-collector paths of said transistors between said first and second points, and said means for biasing said elements comprises means responsive to current flow in the respective intermediate conductor for applying a bias to the base electrode of the respective transistor.

5. The means of claim 4, wherein said means for biasing comprises a separate saturable core corresponding to each intermediate conductor and the respective transistor, means for inductively coupling said intermediate conductor to the respective core, whereby the core is saturated when current flows in the intermediate conductor, a source of cutoff bias potential, first winding means on said cores for applying said bias potential to the base of the respective transistor, a source of pulses, and second winding means on said cores connected to said source of pulses, said pulses having a polarity tending to saturate said cores in the opposite direction, whereby said transistors are rendered conductive by said pulses only in the absence of current flow in the respective intermediate conductor.

6. The means of claim 3, wherein said means for selectively connecting said source between a first point and a second point comprises common resistor means having sufficient resistance that current flow between the selected first and second points can be maintained in only one series path of said elements.

References Cited by the Examiner

UNITED STATES PATENTS

| | | | |
|---|---|---|---|
| 3,020,353 | 2/1962 | Heetman | 179—18.7 |
| 3,093,746 | 6/1963 | Burstow et al. | 179—18.7 |

KATHLEEN H. CLAFFY, *Primary Examiner.*

L. A. WRIGHT, *Assistant Examiner.*

UNITED STATES PATENT OFFICE

CERTIFICATE OF CORRECTION

Patent No. 3,311,708 — March 28, 1967

Jan Louis De Kroes

It is hereby certified that error appears in the above numbered patent requiring correction and that the said Letters Patent should read as corrected below.

In the heading to the printed specification, line 8, for "July 25" read -- July 27 --; column 5, lines 4 and 5, for "conductors" read -- transistors --; column 7, line 54, for "TD 121" read -- TD 1121 --; column 9, line 43, for "corresponding" read -- corresponding --; column 10, line 6, for "potetnia read -- potential --.

Signed and sealed this 7th day of November 1967.

(SEAL)

Attest:

Edward M. Fletcher, Jr.

Attesting Officer

EDWARD J. BRENNER

Commissioner of Patents